US009837081B2

(12) United States Patent
Kannan et al.

(10) Patent No.: US 9,837,081 B2
(45) Date of Patent: Dec. 5, 2017

(54) DISCOVERING CAPABILITIES OF THIRD-PARTY VOICE-ENABLED RESOURCES

(71) Applicant: Microsoft Technology Licensing, LLC, Redmond, WA (US)

(72) Inventors: Vishwac Sena Kannan, Redmond, WA (US); Aleksandar Uzelac, Seattle, WA (US); Jonathan Campbell, Redmond, WA (US); Daniel J. Hwang, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/586,449

(22) Filed: Dec. 30, 2014

(65) Prior Publication Data
US 2016/0189717 A1    Jun. 30, 2016

(51) Int. Cl.
*G10L 17/22*    (2013.01)
*G10L 15/22*    (2006.01)
*G10L 15/26*    (2006.01)

(52) U.S. Cl.
CPC ............. *G10L 17/22* (2013.01); *G10L 15/22* (2013.01); *G10L 15/26* (2013.01)

(58) Field of Classification Search
None
See application file for complete search history.

(56) References Cited

U.S. PATENT DOCUMENTS

| 7,624,351 B2 | 11/2009 | Unger et al. |
| 8,386,929 B2 | 2/2013 | Zaika et al. |
| 8,622,839 B1 | 1/2014 | McKenzie et al. |
| 8,706,503 B2 | 4/2014 | Cheyer et al. |
| 2006/0190554 A1 | 8/2006 | Franz et al. |
| 2008/0059195 A1 | 3/2008 | Brown |
| 2009/0150156 A1 | 6/2009 | Kennewick et al. |
| 2009/0187575 A1* | 7/2009 | DaCosta ............... G06Q 30/06 |
| 2010/0169098 A1 | 7/2010 | Patch |

(Continued)

FOREIGN PATENT DOCUMENTS

| EP | 2699031 A1 | 2/2014 |
| WO | WO 2010/141802 | 12/2010 |

OTHER PUBLICATIONS

"Cortana—Microsoft Virtual Assistant", Published on: Apr. 11, 2014 Available at: "http://www.webopedia.com/TERM/C/cortana-virtual-assistant.html".

(Continued)

*Primary Examiner* — Richa Mishra
(74) *Attorney, Agent, or Firm* — Klarquist Sparkman, LLP

(57) ABSTRACT

Techniques are described for discovering capabilities of voice-enabled resources. A voice-controlled digital personal assistant can respond to user requests to list available voice-enabled resources that are capable of performing a specific task using voice input. The voice-controlled digital personal assistant can also respond to user requests to list the tasks that a particular voice-enabled resource can perform using voice input. The voice-controlled digital personal assistant can also support a practice mode in which users practice voice commands for performing tasks supported by voice-enabled resources.

15 Claims, 10 Drawing Sheets

(56) References Cited

U.S. PATENT DOCUMENTS

| | | | |
|---|---|---|---|
| 2010/0312547 A1* | 12/2010 | Van Os | G06F 3/167 |
| | | | 704/9 |
| 2012/0245944 A1 | 9/2012 | Gruber et al. | |
| 2012/0265528 A1 | 10/2012 | Gruber et al. | |
| 2013/0219333 A1 | 8/2013 | Palwe et al. | |
| 2013/0311997 A1 | 11/2013 | Gruber et al. | |
| 2014/0039885 A1* | 2/2014 | Reich | H04M 3/4938 |
| | | | 704/231 |
| 2014/0114901 A1 | 4/2014 | Pradhan et al. | |
| 2014/0164400 A1 | 6/2014 | Kruglick | |
| 2014/0180697 A1* | 6/2014 | Torok | G06F 17/3074 |
| | | | 704/275 |
| 2014/0201681 A1 | 7/2014 | Mahaffey et al. | |
| 2014/0218372 A1 | 8/2014 | Missig et al. | |
| 2014/0222436 A1 | 8/2014 | Binder et al. | |
| 2014/0365227 A1* | 12/2014 | Cash | G10L 15/22 |
| | | | 704/275 |
| 2015/0081361 A1 | 3/2015 | Lee et al. | |
| 2016/0035353 A1* | 2/2016 | Chen | G10L 17/22 |
| | | | 704/235 |

OTHER PUBLICATIONS

Erhan Onal, B.S., "Dynamic Voice User Interface", A Thesis in Computer Science, Submitted to the Graduate Faculty of Texas Tech University in Partial Fulfillment of the Requirements for the Degree of Master of Science, Aug. 1, 2002, 66 Pages.

International Search Report and Written Opinion, International Application No. PCT/US2015/064172, 18 pages, Jul. 6, 2016.

Second Written Opinion, International Application No. PCT/US2015/064172, 7 pages, Sep. 22, 2016.

International Preliminary Report on Patentability, issued in PCT Application No. PCT/US2015/064172, Dated: Apr. 5, 2017, 9 Pages.

* cited by examiner

DISCOVERING CAPABILITIES OF THIRD-PARTY VOICE-ENABLED RESOURCES

BACKGROUND

As computing technology has advanced, increasingly powerful computing devices have become available. For example, computing devices are increasingly adding features such as speech recognition. Speech can be an effective way for a user to communicate with a computing device, and speech-control is being provided by device software, such as speech-controlled digital personal assistants.

A digital personal assistant can be used to perform tasks or services for an individual. For example, the digital personal assistant can be a software module running on a mobile device or a desktop computer. Examples of tasks and services that can be performed by the digital personal assistant can include making phone calls and setting calendar reminders.

While a user may know how to perform some tasks provided by a digital personal assistant, it may be difficult for the user to learn how to use the digital personal assistant and learn about the tasks that can be performed using the digital personal assistant. Therefore, there exists ample opportunity for improvement in technologies related to speech-controlled digital personal assistants.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for discovering capabilities of third-party voice-enabled resources (e.g., including locally-installed applications, applications available remotely such as those available from an app store, and remote services such as remote web services) using a voice-enabled digital personal assistant. For example, a digital voice input can be received from a user via a microphone (e.g., a microphone associated with a computing device). Natural language processing can be performed using the digital voice input to determine a user voice request. The user voice request can be a request for available third-party voice-enabled applications that are capable of performing a task, a request for available tasks capable of being performed by a specific third-party voice-enabled application, a request to practice voice commands using a practice mode, a request to set configuration options of a voice-enabled digital personal assistant (e.g., to remove support for selected voice commands or tasks), and/or a request to perform another action supported by the voice-enabled digital personal assistant. In some implementations, the user can discover capabilities of third-party voice-enabled resources without using voice input (e.g., the user can enter a text request).

As another example, a computing device comprising a processing unit, memory, and a microphone can be provided for performing operations described herein. For example, a computing device can receive user voice input via the microphone for causing a voice-enabled digital personal assistant to perform operations to determine capabilities of third-party voice-enabled application (e.g., built-in applications and/or applications available remotely).

As described herein, a variety of other features and advantages can be incorporated into the technologies as desired.

DETAILED DESCRIPTION

Overview

Figure 1:
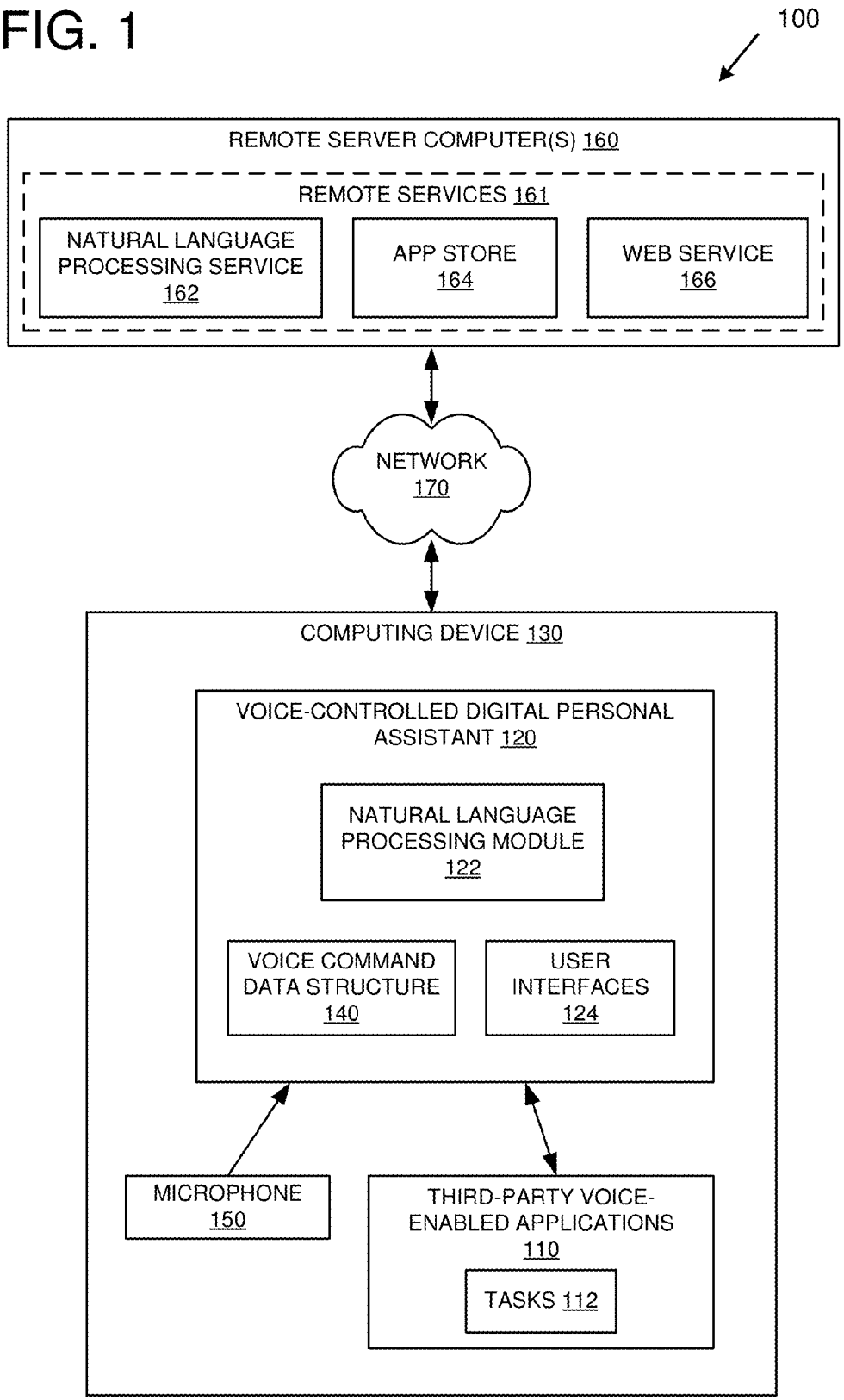
FIG. 1 is a diagram of an example computing environment for discovering capabilities of third-party voice-enabled applications.

As described herein, various techniques and solutions can be applied for discovering capabilities of voice-enabled resources (e.g., including locally-installed applications, applications available remotely such as those available from an app store, and remote services such as remote web services). Technologies are also provided for users to practice using the capabilities of such voice-enabled resources.

For example a voice-controlled digital personal assistant (e.g., an extensible voice-controlled digital personal assistant) can maintain a list of voice-enabled resources (e.g., third-party voice-enabled resources) that are available (e.g., that have registered with the voice-controlled digital personal assistant) along with their capabilities (e.g., the tasks or actions that the voice-enabled applications can perform). The voice-controlled digital personal assistant can help the user discover, understand, manage, and practice the various tasks that the voice-controlled resources can perform.

As used herein, a "voice-enabled" resource (e.g., a third-party voice-enabled resource) is a resource that inherently supports voice input and/or a resource that does not inherently support voice input but is extended to support voice input by registering with a voice-controlled digital personal assistant (e.g., by registering for voice commands with the voice-controlled digital personal assistant).

For example, as a user grows more comfortable with using a voice-controlled digital personal assistant, the user may prefer to perform more actions within the context of the voice-controlled digital personal assistant. However the provider of the voice-controlled digital personal assistant may only initially support a limited number of "built-in" resources (e.g., applications that are part of an operating system provided by a provider of the voice-controlled digital personal assistant, such as phone applications, calendar applications, and web browser applications). Therefore, it can be desirable for the voice-controlled digital personal assistant to include technology for extending support to third-party voice-enabled resources that are created by entities other than the provider of the voice-controlled digital personal assistant.

In some implementations, a voice-controlled digital personal assistant assists the user in determining which third-party voice-enabled resources (e.g., third-party voice-enabled applications) are capable of performing a particular task using voice input (e.g., using speech recognition technology). For example, the user can make a user voice request using the user's computing device (e.g., smart phone, tablet, or other type of computing device) such as, "Which applications can play movies?" The voice-controlled digital personal assistant can determine which third-party voice-enabled applications are capable of performing the task and inform the user. For example, the voice-controlled digital personal assistant can display a list of the third-party voice-enabled applications that can perform the task (e.g., that can play movies on the user's computing device). Instead of, or in addition to, displaying the list, the voice-controlled digital personal assistant can tell the user which party voice-enabled applications can perform the task using voice output (e.g., by speaking to the user using a simulated voice via an audio playback component of the user's computing device). In some implementations, the user can discover capabilities of third-party voice-enabled resources without using voice input. For example, the user can use text input (e.g., typed via an on-screen keyboard) to perform a request using the voice-controlled digital personal assistant (e.g., the user could type "Which applications can play movies?").

By allowing the user to ask the voice-controlled digital personal assistant for available third-party voice-enabled resources (e.g., third-party voice-enabled applications) that can perform a particular task, the user can more quickly and efficiently discover and use such third-party voice-enabled resources. For example, the user may install various third-party voice-enabled applications on the user's computing device. In order to discover which of the third-party voice-enabled applications can perform a particular task, the user could open each third-party voice-enabled application to try and determine which tasks are available. In order to avoid this time-consuming and inefficient process, the technologies described herein allow the user to ask the voice-controlled digital personal assistant which third-party voice-enabled applications are available (e.g., installed on the user's device and/or available from another source such as an app store or online service) to perform a particular task. For example, the user could ask "Where can I find the best deal on <specific product>?" In response, the voice-controlled digital personal assistant could inform the user about locally-installed applications that provide pricing and availability for the specific product (e.g., a specific digital camera model). The voice-controlled digital personal assistant could also inform the user about applications available from an app store (e.g., apps that the user can download and install that provide product pricing information) and/or remote web services (e.g., an online shopping website that sells the specific product identified by the user). As another example, the user could ask "What can I do on <web service>?" In response, the voice-controlled digital personal assistant could inform the user of the capabilities of the web service (e.g., if the user asks "What can I do on Amazon®," the voice-controlled digital personal assistant could list: shopping, watch movies, and listen to music).

In some implementations, a voice-controlled digital personal assistant assists the user in determining which tasks a particular third-party voice-enabled resource (e.g., a third-party voice-enabled application) can perform. For example, the user can make a voice request using the user's computing device (e.g., smart phone, tablet, or other type of computing device) such as, "What tasks can <name of specific application> perform?" The voice-controlled digital personal assistant can determine which tasks the specific third-party voice-enabled application is capable of performing using voice input and inform the user. For example, the voice-controlled digital personal assistant can display a list of the tasks (e.g., along with corresponding voice commands) that the specific third-party voice-enabled application is capable of performing. Instead of, or in addition to, displaying the list, the voice-controlled digital personal assistant can tell the user which tasks the specific third-party voice-enabled application is capable of performing (e.g., by speaking to the user using a simulated voice via an audio playback component of the user's computing device).

By allowing the user to ask the voice-controlled digital personal assistant which tasks are capable of being performed by a particular third-party voice-enabled resource, the user can more quickly and efficiently discover and utilize the capabilities of the particular third-party voice-enabled resource. For example, the user may install a particular third-party voice-enabled application on the user's computing device. In order to discover what tasks the particular third-party voice-enabled application can perform using voice commands, the user could open the particular third-party voice-enabled application to try to determine which tasks are available (e.g., by scrolling through menus or help information). In order to avoid this time-consuming and inefficient process, the technologies described herein allow the user to ask the voice-controlled digital personal assistant to provide the tasks that can be performed by the particular third-party voice-enabled application (e.g., installed on the user's device and/or available from another source such as an app store or online service).

In some implementations, a voice-controlled digital personal assistant assists the user in practicing voice commands for performing tasks supported by third-party voice-enabled resources (e.g., third-party voice-enabled applications). For example, the user can make a voice request using the user's computing device to practice a voice command for a particular task such as, "Practice adding a movie to my queue using <name of specific application>." The user can then speak the voice command for initiating the particular task (e.g., upon being prompted by the voice-controlled digital personal assistant). The voice-controlled digital personal assistant can then determine if the voice command spoken by the user would activate the task. The voice-controlled digital personal assistant can make the determination without having to communicate with the third-party voice-enabled application that would otherwise (in a non-practice situation) be performing the task. The third-party voice-enabled application can then report to the user (e.g., visually and/or by a spoken response) whether the user's voice command would have been successful in performing the task. For example, if the voice command is understood (e.g., matches a voice command for performing a particular task) then the voice-controlled digital personal assistant can return a result similar to the result that would have been returned by the third-party voice-enabled application (e.g., "The movie has been added to your queue."). If the voice command is not understood (e.g., if no match is found) then the voice-controlled digital personal assistant can inform the user (e.g., "I did not understand your request.") and in some implementations provide suggestions (e.g., provide a list of voice command variations that the user can speak to perform the task along with voice command examples).

By allowing the user to practice voice commands using the voice-controlled digital personal assistant, the user can become proficient with the voice commands and reduce the number of mistakes (and subsequent retries) when performing the voice commands using the actual third-party voice-enabled resources. For example, the voice-controlled digital personal assistant can assist the user in selecting and practicing various ways that a user can perform a particular task (e.g., by allowing the user to identify a particular voice command variation that the user can remember). Practicing voice commands using the voice-controlled digital personal assistant can reduce user anxiety about using voice input to control the third-party voice-enabled applications.

In some implementations, the voice-controlled digital personal assistant allows the user to manage the tasks performed by third-party voice-enabled resources (e.g., by setting preferences). In some implementations, the user can remove, or otherwise deactivate, tasks performed by third-party voice-enabled applications. For example, the user may want to remove (e.g., delete) a particular task, and its corresponding voice commands for performing the task, supported by a particular third-party voice-enabled application so that the task cannot be activated by voice input. Removing a particular task can improve reliability of voice commands (e.g., by reducing the likelihood of the voice-controlled digital personal assistant selecting a voice command that may be similar to, or confused with, a desired voice command). In addition, removing a particular task can improve performance because the voice-controlled digital personal assistant has fewer voice command options to review when determining a match for a user voice input. As a specific example, a voice-enabled banking application may support tasks including a bill payment task that is activated using a bill payment voice command (e.g., "pay my bills"). If the user does not use the bank's bill payment system, the user can use the voice-controlled digital personal assistant to remove or otherwise disable the bill payment task and its corresponding voice commands (e.g., to remove or otherwise disable all voice command variations that would perform the bill payment task). In some implementations, the user may also remove specific voice command variations that can perform a particular task (e.g., only one or more specific voice command variations that the user does not want to use, which can also help improve reliability and consistency of the voice-controlled digital personal assistant).

Extensible Voice-Controlled Digital Personal Assistant

In the technologies described herein, an extensible voice-controlled digital personal assistant can provide a voice user interface for interacting with users using voice commands. The extensible voice-controlled digital personal assistant can assist the user in discovering capabilities of third-party voice-enabled resources (e.g., applications) that are available on the user's computing device (e.g., the user's phone or tablet device, or another type of computing device) and/or available from another location, such as an app store or accessible via an online service. The extensible voice-controlled digital personal assistant can also assist the user in practicing various voice commands that are supported by the third-party voice-enabled applications. The extensible voice-controlled digital personal assistant can also allow the user to configure options (e.g., remove tasks or voice commands).

The functionality of the extensible digital personal assistant is not limited to operating system features and associated services (e.g., built-in or operating system provided applications such as email, calendar, and mapping applications). Instead, the extensible digital personal assistant can be extended to support third-party voice-enabled applications.

In some implementations, third-party voice-enabled applications register their capabilities with the extensible digital personal assistant. For example, a third-party voice-enabled application could register a number of voice commands for performing a number of tasks with the extensible digital personal assistant. Registering a voice command can include registering variations of the voice command (voice command variations) that the user could speak in order to perform the voice command as well as various examples (voice command examples) that can be provided to the user.

In some implementations, third-party voice-enabled applications register their capabilities with the extensible digital personal assistant using a data structure. The data structure can identify the third-party voice-enabled application and the commands (voice commands) supported by the third-party application along with associated voice command variations and voice command examples. In some implementations, the data structure is implemented as an XML structure.

Registering Third-Party Voice-Enabled Resources

In the technologies described herein, third-party voice-enabled resources (e.g., applications) can register with an extensible voice-controlled digital personal assistant. For example, a third-party voice-enabled application can register its capabilities with the voice-controlled digital personal assistant by identifying the specific voice commands that the application can handle to perform various tasks. For example, a third-party voice-enabled application could register a number of voice commands for performing a number of tasks with the voice-controlled digital personal assistant. Registering a voice command can include registering variations of the voice command (voice command variations) that the user could speak in order to perform the voice command as well as various examples (voice command examples) that can be provided to the user. As another example, a third-party voice-enabled web service, or an application located at an app store, can register its capabilities with the voice-controlled digital personal assistant.

In some implementations, third-party voice-enabled resources register their capabilities with the voice-controlled digital personal assistant using a data structure. The data structure can identify the third-party voice-enabled resource and the commands (voice commands) supported by the third-party voice-enabled application along with associated voice command variations and voice command examples. In some implementations, the data structure is implemented in an XML format.

As a simplified example, a third-party voice-enabled application supporting digital video management and playback (e.g., an application such as Netflix®) could define a number of commands for managing queues, playing video content, etc. Table 1 below provides a simplified example of a number of such voice commands along with their associated voice command variations (the variations of voice input that are associated with the voice command and that are used to perform the voice command task) and voice command examples (examples of the variations of voice input that can be provided to the user to illustrate how the user can activate the voice command).

TABLE 1

Example Voice Commands

| Voice Command | Voice Command Variations and Examples |
|---|---|
| Add movie to my queue | Variations:<br>  "Add <movie name> to my queue"<br>  "Please add <movie name> to my Netflix queue"<br>  "Please put <movie name> in my queue"<br>Examples:<br>  "Add The Matrix to my queue"<br>  "Please add The Matrix to my queue"<br>  "Please put The Matrix in my Netflix queue"<br>  "Please put The Croods in my queue" |
| Play movie | Variations:<br>  "Play <movie name>"<br>  "Please play <movie name> thank you"<br>  "Start <movie name>"<br>Examples:<br>  "Play The Matrix"<br>  "Please play The Croods thank you"<br>  "Start The Matrix" |
| View queue | Variations:<br>  "View queue"<br>  "View my queue"<br>  "View my Netflix queue"<br>Examples:<br>  "View queue"<br>  "View my queue"<br>  "View my Netflix queue" |

In some implementations, third-party voice-enabled resources register their capabilities with the digital personal assistant using a schema definition. For example, the voice-controlled digital personal assistant can receive and/or store a voice command definition (VCD) file that defines the voice commands and associated tasks supported by the third-party voice-controlled resources. An example VCD scheme for two voice commands is depicted below. Specifically, the example VCD scheme below defines a voice command for adding a movie to the user's queue and a voice command for deleting a movie from the user's queue, which could be two voice command provided by a third-party voice-controlled application for playing media content.

VCD Scheme (Example):

```
<appName> MovieApp </appName>
<Command Name="AddMovie">
<Example> add movie to queue </Example>
<ListenFor> add {Movie} to queue </ListenFor>
<ListenFor> add {Movie} to my queue </ListenFor>
<Feedback> Sure, I've added {Movie} to your queue </Feedback>
<Navigate Target="/queue.xaml"/>
</Command>
<Command Name="DeleteMovie">
<Example> delete movie to queue </Example>
<ListenFor> delete {Movie} to queue </ListenFor>
<ListenFor> delete {Movie} to my queue </ListenFor>
<Feedback> Sure, I've deleted {Movie} from your queue </Feedback>
<Navigate Target="/queue.xaml"/>
</Command>
```

A scheme definition (e.g., a VCD scheme definition) can be used to define capabilities of remote applications and remote web services. For example, the voice-controlled digital personal assistant can access a VCD file at a remote location (e.g., a remote web site) to extend functionality for voice-enabling a web service or a remotely-available application (e.g., available from an application store).

Discovering Capabilities of Third-Party
Voice-Enabled Resources

In the technologies described herein, a voice-controlled digital personal assistant can provide a voice user interface for interacting with users using voice commands. The voice-controlled digital personal assistant can assist the user in discovering capabilities of third-party voice-enabled resources.

FIG. 1 is a diagram of an example environment 100 for discovering capabilities of third-party voice-enabled resources. The example environment 100 includes a computing device 130 (e.g., a phone, tablet, laptop, desktop, or another type of computing device). The computing device 130 includes a microphone 150 for converting sound to an electrical signal. The microphone 150 can be a dynamic, condenser, or piezoelectric microphone using electromagnetic induction, a change in capacitance, or piezoelectricity, respectively, to produce the electrical signal from air pressure variations. The microphone 150 can include an amplifier, one or more analog or digital filters, and/or an analog-to-digital converter to produce a digital sound input. The digital sound input can comprise a reproduction of the user's voice, such as when the user is commanding the voice-controlled digital personal assistant 120 to accomplish a task.

The voice-controlled digital personal assistant 120 runs on the computing device 130 and allows the user of the computing device 130 to perform various actions using voice input. For example, the voice-controlled digital personal assistant 120 can receive user voice input via the microphone 150, determine a corresponding voice command from the user voice input using the voice command data structure 140, and perform the voice command. In some situations, the controlled digital personal assistant 120 sends the voice command to one of the third-part voice-enabled applications 110. In other situations, the voice-controlled digital personal assistant 120 handles the voice command itself (e.g., when the user is practicing the voice command).

The voice command data structure 140 can identify the third-party voice-enabled applications 110 and the commands (voice commands) supported by the third-party voice-enabled applications 110 along with associated voice command variations and voice command examples. In some implementations, the voice command data structure 140 is implemented in an XML format. In some implementations, the voice command data structure 140 can identify voice-enabled applications available remotely from an app store 164 and/or voice-enabled services available remotely from a web service 166 (e.g., by accessing a scheme definition available from the remote server computers 160 that defines the capabilities for the remote applications and/or the remote services).

The voice-controlled digital personal assistant 120 can process user voice input using a natural language processing module 122. The natural language processing module 122 can receive the digital sound input and translate words spoken by a user into text using speech recognition. The extracted text can be semantically analyzed to determine a user voice command. By analyzing the digital sound input and taking actions in response to spoken commands, the voice-controlled digital personal assistant 120 can be controlled by the voice input of the user. For example, the voice-controlled digital personal assistant 120 can compare extracted text to a list of potential user commands (e.g., stored in the voice command data structure 140) to determine the command mostly likely to match the user's intent. The match can be based on statistical or probabilistic methods, decision-trees or other rules, other suitable matching criteria, or combinations thereof. The potential user commands can be native commands of the voice-controlled digital personal assistant 120 and/or commands defined in the command data structure 140. Thus, by defining commands in the command data structure 140, the range of tasks that can be performed on behalf of the user by the voice-controlled digital personal assistant 120 can be extended. The potential commands can include voice commands for performing the available tasks 112 of the third-party voice-enabled applications 110.

The voice-controlled digital personal assistant 120 includes voice and/or graphical user interfaces 124. The user interfaces 124 can provide information to the user describing the capabilities of the third-party voice-enabled applications 110. For example, the user interfaces 124 can provide a list of available third-party voice-enabled applications 110 that are capable of performing a task requested by the user or a list of available tasks that a particular one of the third-party voice-enabled applications 110 can perform. The user interfaces 124 can provide feedback regarding practiced voice commands (e.g., successful responses, feedback regarding variations of the voice command, etc.).

The voice-controlled digital personal assistant 120 can access remote services 161 executing on the remote server computers 160. Remote services 161 can include software functions provided at a network address over a network, such as a network 170. The network 170 can include a local area network (LAN), a Wide Area Network (WAN), the Internet, an intranet, a wired network, a wireless network, a cellular network, combinations thereof, or any network suitable for providing a channel for communication between the computing device 130 and the remote server computers 160. It should be appreciated that the network topology illustrated in FIG. 1 has been simplified and that multiple networks and networking devices can be utilized to interconnect the various computing systems disclosed herein. The remote services 161 can include various computing services that are accessible from the remote server computers 160 via the network 170. The remote services 161 can include natural language processing services 162 (e.g., called by the voice-controlled digital personal assistant 120 to perform, or assist with, natural language processing functions). The remote services 161 can include an app store (e.g., an app store providing voice-enabled applications that can be searched or downloaded and installed). The remote services 161 can also include web services 166 which can be accessed via voice input using the voice-controlled digital personal assistant 120. The remote services 161 can also include an app store 164 which can provide applications for use by the computing device 130 (e.g., for downloading and installing third-party voice-enabled applications).

User Interfaces for Discovering Capabilities of Third-Party Voice-Enabled Resources In the technologies described herein, an extensible voice-controlled digital personal assistant can provide a variety of graphical and/or voice-controlled user interfaces for interacting with users using voice commands. The user interfaces can be provided for discovering capabilities of third-party voice-enabled resources. For example, the user interfaces can be provided for discovering which third-party voice-enabled resources can perform a particular task, for discovering which tasks a particular third-party voice-enabled resources can perform, for practicing voice input for performing tasks using third-party voice-enabled resources, and/or for configuring options of the voice-controlled digital personal assistant.

Figure 2:
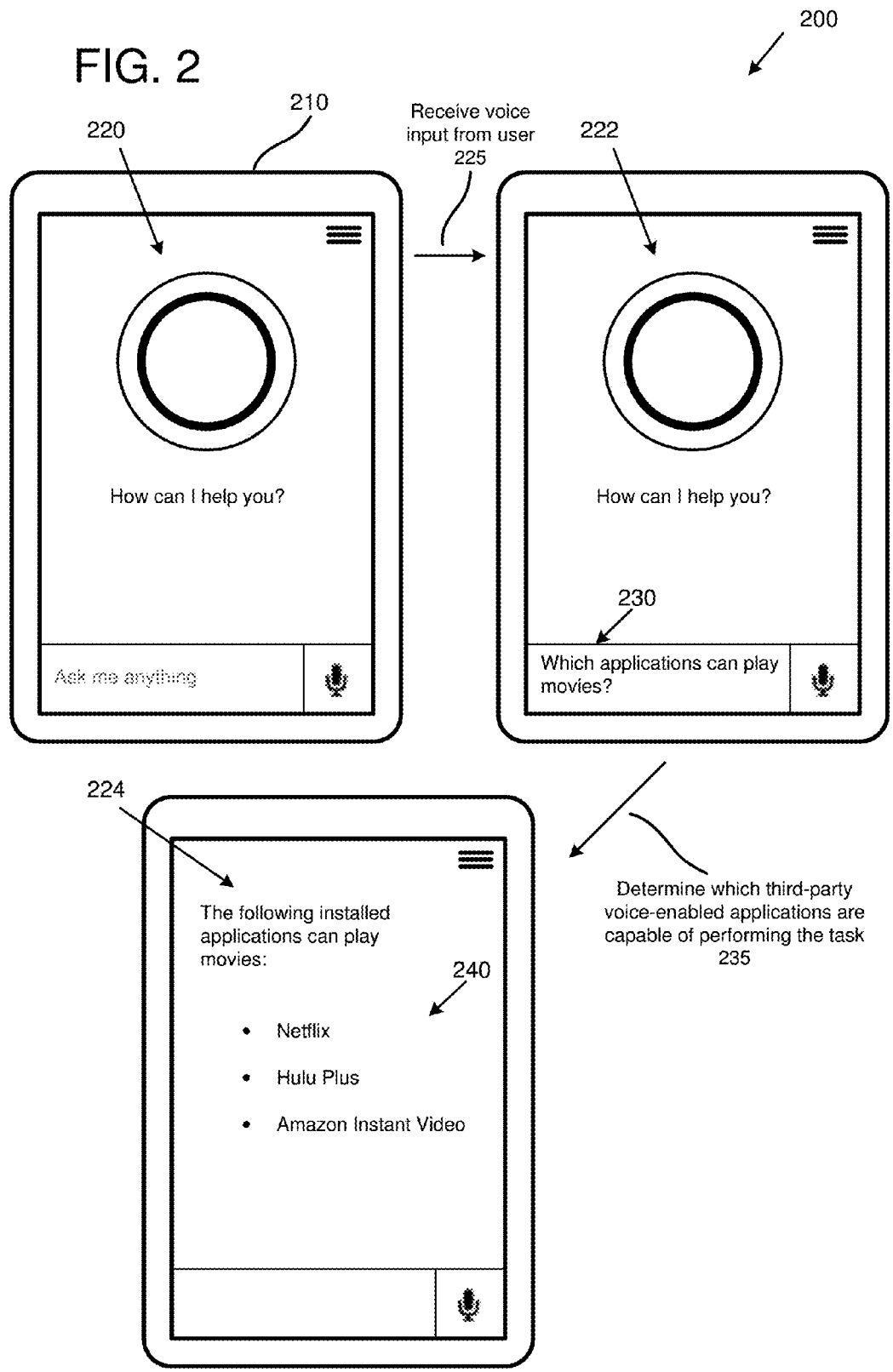
FIG. 2 is a diagram depicting a user interface example for interacting with a voice-enabled digital personal assistant for discovering which third-party voice-enabled applications can perform a task.

FIG. 2 is a diagram depicting a user interface example 200 for interacting with a voice-enabled digital personal assistant for discovering capabilities of third-party voice-enabled applications, including discovering which third-party voice-enabled applications can perform a task. Specifically the user interface example 200 in FIG. 2 depicts a scenario where the user is trying to discover which third-party voice-enabled applications are available to perform a particular task. The voice-enabled digital personal assistant runs on computing device 210 (e.g., a phone, tablet, or another type of computing device).

In the user interface example 200, the voice-controlled digital personal assistant provides a first graphical user interface 220 prompting the user to provide a voice command. In order to enter the voice command, the user can activate voice input by selecting a user interface element (e.g., tap on the screen, select the microphone icon, etc.) or by performing another action (e.g., pressing a button on the device, or just speaking the voice command to the device).

As depicted at 225, the user has provided voice input (e.g., digital voice input received via a microphone of the computing device 210). In response to the voice input, a second graphical user interface 222 is provided by the voice-controlled digital personal assistant. As depicted in the second graphical user interface 222, the voice-controlled digital personal assistant has determined a user voice request from the digital voice input (e.g., via natural language processing performed by the computing device 210 and/or by an external service such as a cloud service). The user voice request in this example is, "Which applications can play movies?" as depicted at 230.

As depicted at 235, the voice-controlled digital personal assistant next determines which third-party voice-enabled applications are capable of performing the task requested by the user. Specifically, in this example, the voice-controlled digital personal assistant determines which third-party voice-enabled applications are capable of playing movies. In response, the voice-controlled digital personal assistant displays the third graphical user interface 224 listing, at 240, the third-party voice-enabled applications that are capable of performing the task. Specifically, in this example, the third-party voice-enabled applications that are capable of playing a movie on the computing device 210 include Netflix®, Hulu® Plus, and Amazon Instant Video®.

Figure 3:
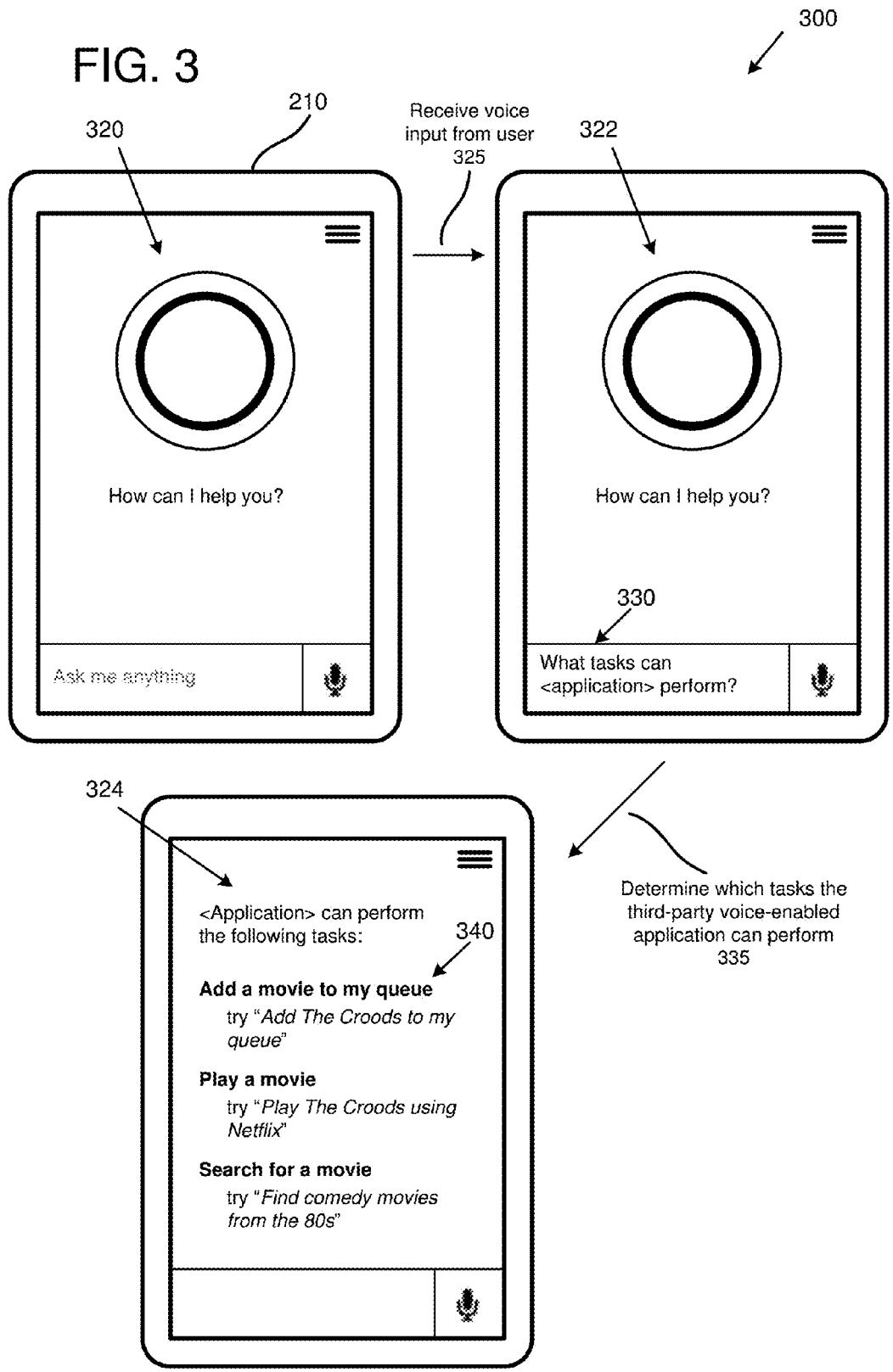
FIG. 3 is a diagram depicting a user interface example for interacting with a voice-enabled digital personal assistant for discovering which tasks a third-party voice-enabled application can perform.

FIG. 3 is a diagram depicting a user interface example 300 for interacting with a voice-enabled digital personal assistant for discovering capabilities of third-party voice-enabled applications, including discovering which tasks a particular third-party voice-enabled application can perform. Specifically the user interface example 300 in FIG. 3 depicts a scenario where the user is trying to discover which tasks a particular third-party voice-enabled application can perform.

In the user interface example 300, the voice-controlled digital personal assistant provides a first graphical user interface 320 prompting the user to provide a voice command. In order to enter the voice command, the user can activate voice input by selecting a user interface element (e.g., tap on the screen, select the microphone icon, etc.) or by performing another action (e.g., pressing a button on the device, or just speaking the voice command to the device).

As depicted at 325, the user has provided voice input. In response to the voice input, a second graphical user interface 322 is provided by the voice-controlled digital personal assistant. As depicted in the second graphical user interface 322, the voice-controlled digital personal assistant has determined a user voice request from the digital voice input (e.g., via natural language processing performed by the computing device 210 and/or by an external service such as a cloud service). The user voice request in this example is, "Which tasks can <application> perform?" as depicted at 330. For example, if the user is asking which tasks the Netflix application can perform, then the voice request would be, "Which tasks can Netflix perform?"

As depicted at 335, the voice-controlled digital personal assistant next determines which tasks the particular third-party voice-enabled application is capable of performing. For example, if the user asked which tasks the Netflix application can perform, then the third graphical user interface 324 can be displayed listing the tasks depicted at 340. The tasks depicted at 340 are example voice commands that can be supported by the Netflix application along with voice examples illustrating how the user can use a given voice command. In some implementations, the third-party voice-enabled application can control the format of the display of the available voice commands (e.g., including voice command variations and voice command examples). For example, the third-party voice-enabled application can control which voice commands are displayed and how the display is organized (e.g., which variations and examples are displayed and how they are arranged).

Figure 4:
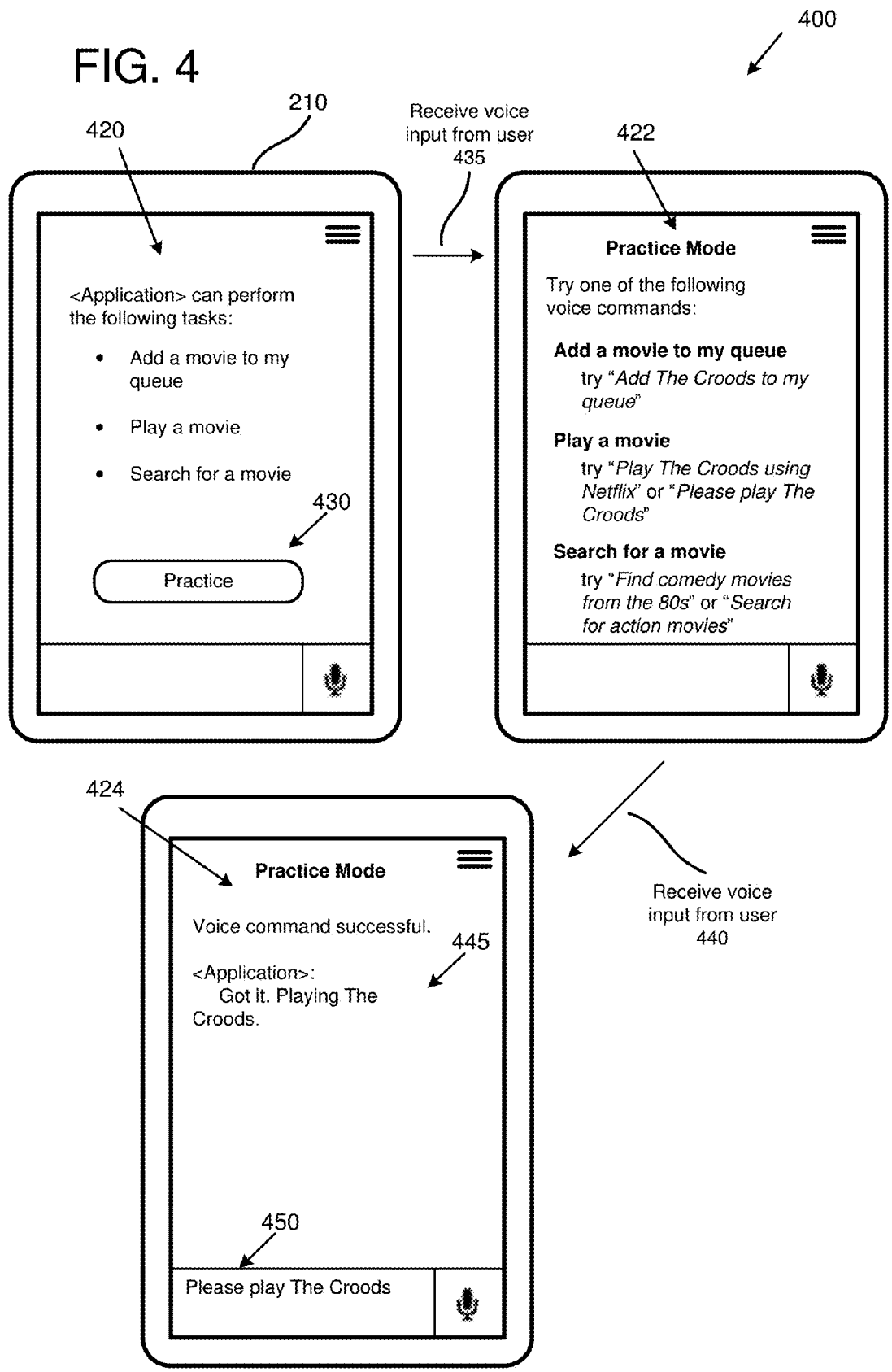
FIG. 4 is a diagram depicting a user interface example for interacting with a voice-enabled digital personal assistant for practicing voice commands of third-party voice-enabled applications.

FIG. 4 is a diagram depicting a user interface example 400 for interacting with a voice-enabled digital personal assistant for discovering capabilities of third-party voice-enabled applications, including practicing voice commands of third-party voice-enabled applications. Specifically the user interface example 400 in FIG. 4 depicts a scenario where the user is trying to practice voice commands for performing tasks of a third-part voice-enabled application.

In the user interface example 400, the voice-controlled digital personal assistant provides a first graphical user interface 420 depicting a list of tasks that can be performed by a selected third-party voice-enabled application. In this example, the third-party voice-enabled application can be the Netflix application that supports voice commands for playing a movie, adding a movie to the user's queue, and searching for movies. For example, the first graphical user interface 420 can be displayed as a result of the user asking the voice-controlled digital personal assistant which tasks a particular third-party voice-enabled application can perform, as depicted in FIG. 3.

Using the first graphical user interface 420, the user performs an action to initiate a practice mode. The action can include selecting a user interface element (e.g., selecting a practice button, as depicted at 430) and/or speaking a voice command (e.g., as indicated by the voice input 435). In response to entering the practice mode, the second graphical user interface 422 is displayed that lists the various voice commands that the user can practice along with a number of voice command examples.

As depicted at 440, the user has provide voice input for practicing a voice command. In response to the voice input, the voice-controlled digital personal assistant determines (e.g., using natural language processing) the voice command that the user has spoken and compares it to the available voice commands (e.g., to the possible voice command variations) for the particular third-party voice-enabled application. The voice-controlled digital personal assistant then presents results of the practiced command to the user (e.g., an indication of a successful command or an unsuccessful command). In the example depicted in the third graphical user interface 424, the user has spoken the voice command "Please play The Croods" (as depicted at 450) which matches one of the voice commands provided by the third-party voice-enabled application (in this example, provided by Netflix), and therefore the user is presented with a message stating that the voice command would cause the application to perform the task (in this example, play the movie) as depicted at 445. In some implementations, the third-party voice-enabled application can control the format of the display of the available tasks and practice mode voice commands. For example, the third-party voice-enabled application can control the content and format of the information depicted in the example user interfaces 420, 422, and 424.

The user interface examples 200, 300, and 400 discussed above depict, in part, a graphical user interface for interacting with the voice-controlled digital personal assistant. However, in some implementations, the voice-controlled digital personal assistant can interact with the user solely using voice input/output. In addition, the user interface examples 200, 300, and 400 are described in the context of third-party voice-enabled applications (e.g., installed on the computing device displaying the user interface). However, the user interface examples 200, 300, and 400 also apply in the context of other third-party voice-enabled resources such as remote voice-enabled applications and remote services (e.g., remote voice-enabled web services).

Methods for Discovering Capabilities of Third-Party Voice-Enabled Resources

In any of the examples herein, methods can be provided for discovering capabilities of third-party voice-enabled resources. For example, a voice-controlled digital personal assistant can respond to user voice requests to list which third-party voice-enabled applications can perform a particular task or which task can be performed by a particular third-party voice-enabled application. A voice-controlled digital personal assistant can also allow the user to practice voice commands supported by third-party voice-enabled applications and set configuration options.

Figure 5:
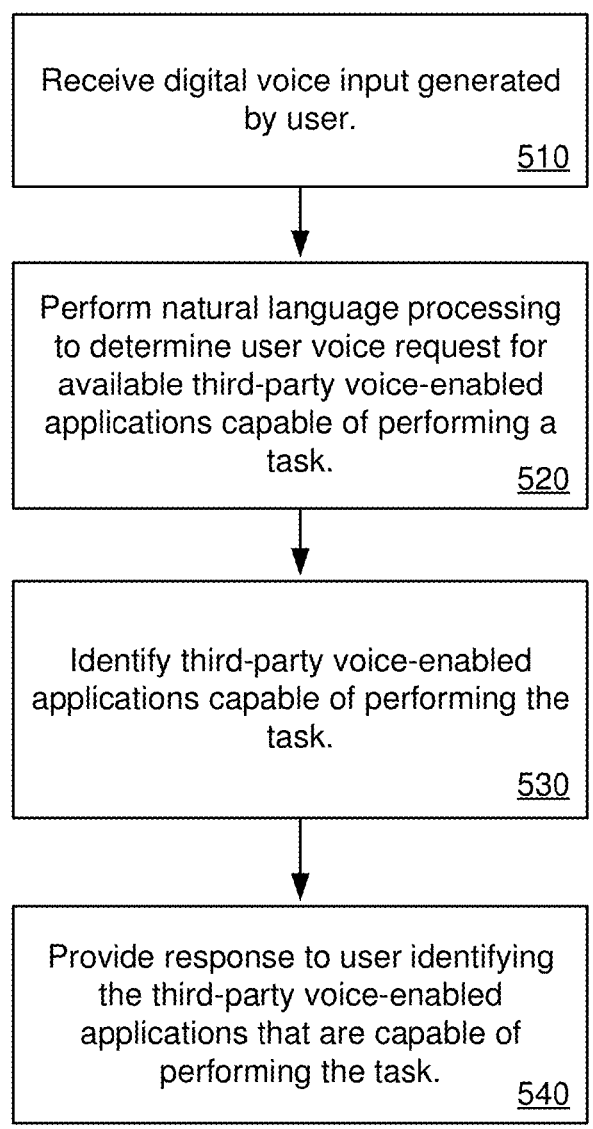
FIGS. 5, 6, and 7 are flowcharts of example methods for discovering capabilities of third-party voice-enabled applications.

FIG. 5 is a flowchart of an example method 500 for discovering capabilities of third-party voice-enabled applications. The example method 500 can be performed, at least in part, by a computing device, such as computing device 210. The example method 500 can be performed, at least in part, by a voice-controlled digital personal assistant running on the computing device.

At 510, a digital voice input is received by a voice-controlled digital personal assistant. The digital voice input can be received from a user via a microphone.

At 520, natural language processing is performed to determine a user voice request for available third-party voice-enabled applications capable of performing a task. In some implementations, the third-party voice-enabled applications are local applications installed on the computing device. In some implementations, the third-party voice-enabled applications can be local applications installed on the computing device and/or applications available remotely (e.g., at an app store or via an online service).

At 530, third-party voice-enabled applications are identified that are capable of performing the task. For example, the third-party voice-enabled applications can be identified using a data structure that defines tasks supported by available third-party voice-enabled applications. In some implementations, the voice-controlled digital personal assistant searches through the data structure to identify available third-party voice-enabled applications (e.g., locally-installed applications and/or remotely available applications) that can perform the requested task using voice input.

At 550, a response is provided to the user identifying the third-party voice-enabled applications that are capable of performing the task. The response can be provided by a graphical user interface (e.g., as a list of the third-party voice-enabled applications) and/or via audio output (e.g., by the voice-controlled digital personal assistant telling the user which third-party voice-enabled applications are capable of performing the task). The response can also include indications of voice command variations, including voice command examples, for performing the task. In some implementations, the user can practice voice commands that are available for performing the task.

Figure 6:
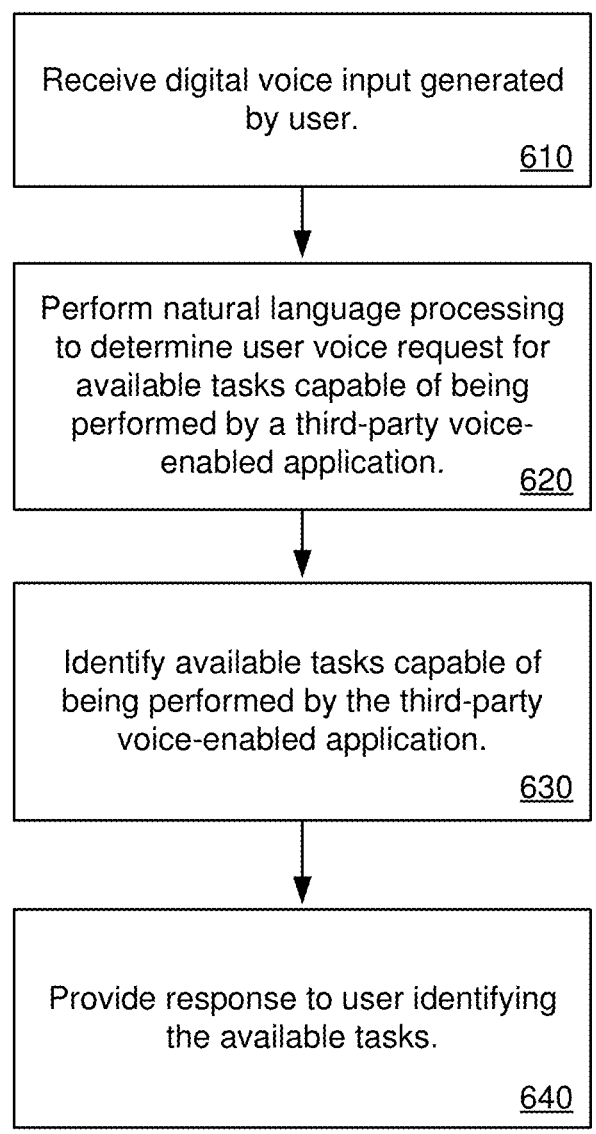

FIG. 6 is a flowchart of an example method 600 for discovering capabilities of third-party voice-enabled applications. The example method 600 can be performed, at least in part, by a computing device, such as computing device 210. The example method 600 can be performed, at least in part, by a voice-controlled digital personal assistant running on the computing device.

At 610, a digital voice input is received by a voice-controlled digital personal assistant. The digital voice input can be received from a user via a microphone.

At 620, natural language processing is performed to determine a user voice request for available tasks capable of being performed by a specific third-party voice-enabled application. In some implementations, the specific third-party voice-enabled application is a local application installed on the computing device. In some implementations, the specific third-party voice-enabled application can be a local application and/or an application available remotely (e.g., at an app store or via an online service).

At 630, available tasks that are capable of being performed by the specific third-party voice-enabled application are identified. For example, the available tasks can be identified using a data structure that defines tasks supported by the specific third-party voice-enabled application. In some implementations, the voice-controlled digital personal assistant searches through the data structure to identify available tasks supported by the specific third-party voice-enabled application.

At 640, a response is provided to the user (e.g., as a graphical user interface response and/or a voice response) identifying the available tasks. For example, the voice-controlled digital personal assistant can display a list of the tasks to the user along with associated voice command variations and voice command examples.

Figure 7:
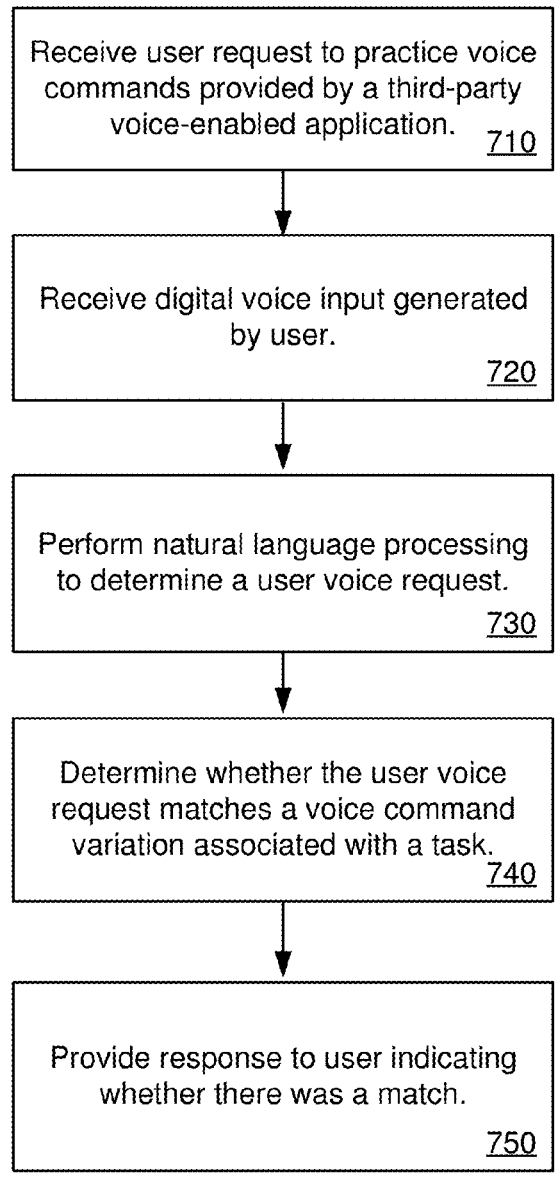

FIG. 7 is a flowchart of an example method 700 for discovering capabilities of third-party voice-enabled applications. The example method 700 can be performed, at least in part, by a computing device, such as computing device 210. The example method 700 can be performed, at least in part, by a voice-controlled digital personal assistant running on the computing device.

At 710, a user request is received by a voice-controlled digital personal assistant to practice voice commands provided by a third-party voice-enabled application. For example, the request can be received in response to the user selecting a user interface element (e.g., tapping on a displayed graphical icon) to practice voice commands for a currently-selected third-party voice-enabled application. The request can also be received from the user via voice input (e.g., by the user requesting to practice voice commands of a particular third-party voice-enabled application).

At 720, a digital voice input is received by the voice-controlled digital personal assistant. The digital voice input can be received from a user via a microphone.

At 730, natural language processing is performed to determine a user voice request. The user voice request represents the user's attempt at performing a task supported by the third-party voice-enabled application using voice input.

At 740, a determination is made regarding whether the user voice request matches a voice command variation associated with a task of the third-party voice-enabled application. For example, the voice-controlled digital personal assistant can determine whether the user voice request matches a voice command variation using a data structure defining voice commands supported by the third-party voice-enabled application.

At 750, a response is provided to the user indicating whether there was a match between the user voice request and a voice command variation. The response can be provided in the format of a graphical user interface and/or a voice response. The response can indicate which voice command variation matched the user voice request and/or which task would have been performed by the user voice request had practice mode not been engaged.

The example method 700 can be performed by the voice-controlled digital personal assistant without the voice-controlled digital personal assistant having to communicate with the third-party voice-enabled application. In this manner, the voice-controlled digital personal assistant can allow the user to practice voice commands without running the party voice-enabled application. For example, the voice-controlled digital personal assistant can determine whether the user voice input matches a voice command variation solely using the data structure maintained by the voice-controlled digital personal assistant.

The example methods 500, 600, and 700 are described in the context of third-party voice-enabled applications. However, the user example methods 500, 600, and 700 also apply in the context of other third-party voice-enabled resources such as remote voice-enabled applications and remote services (e.g., remote voice-enabled web services).

Computing Systems

Figure 8:
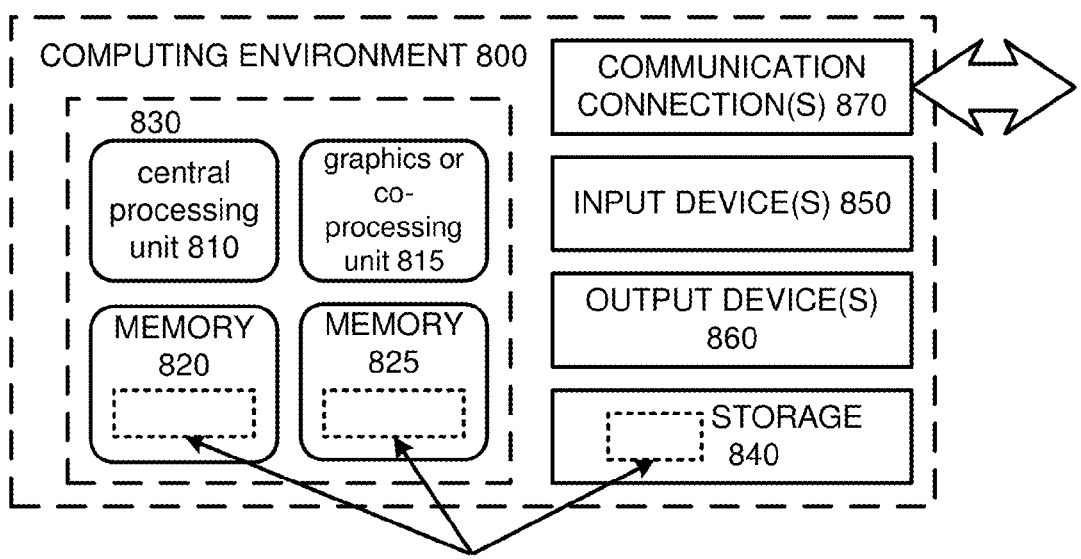
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
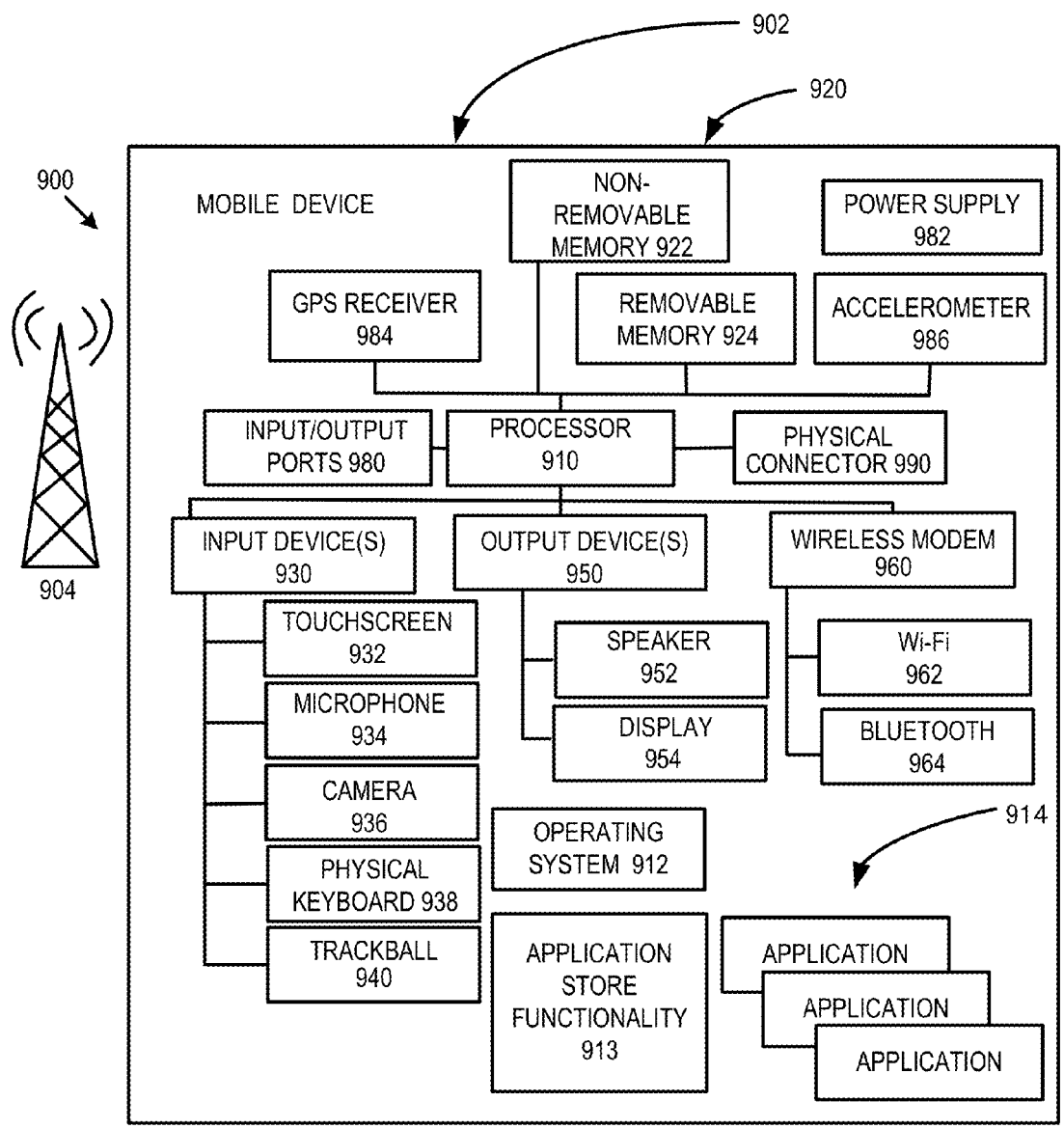
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can he combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Cloud-Supported Environment

Figure 10:
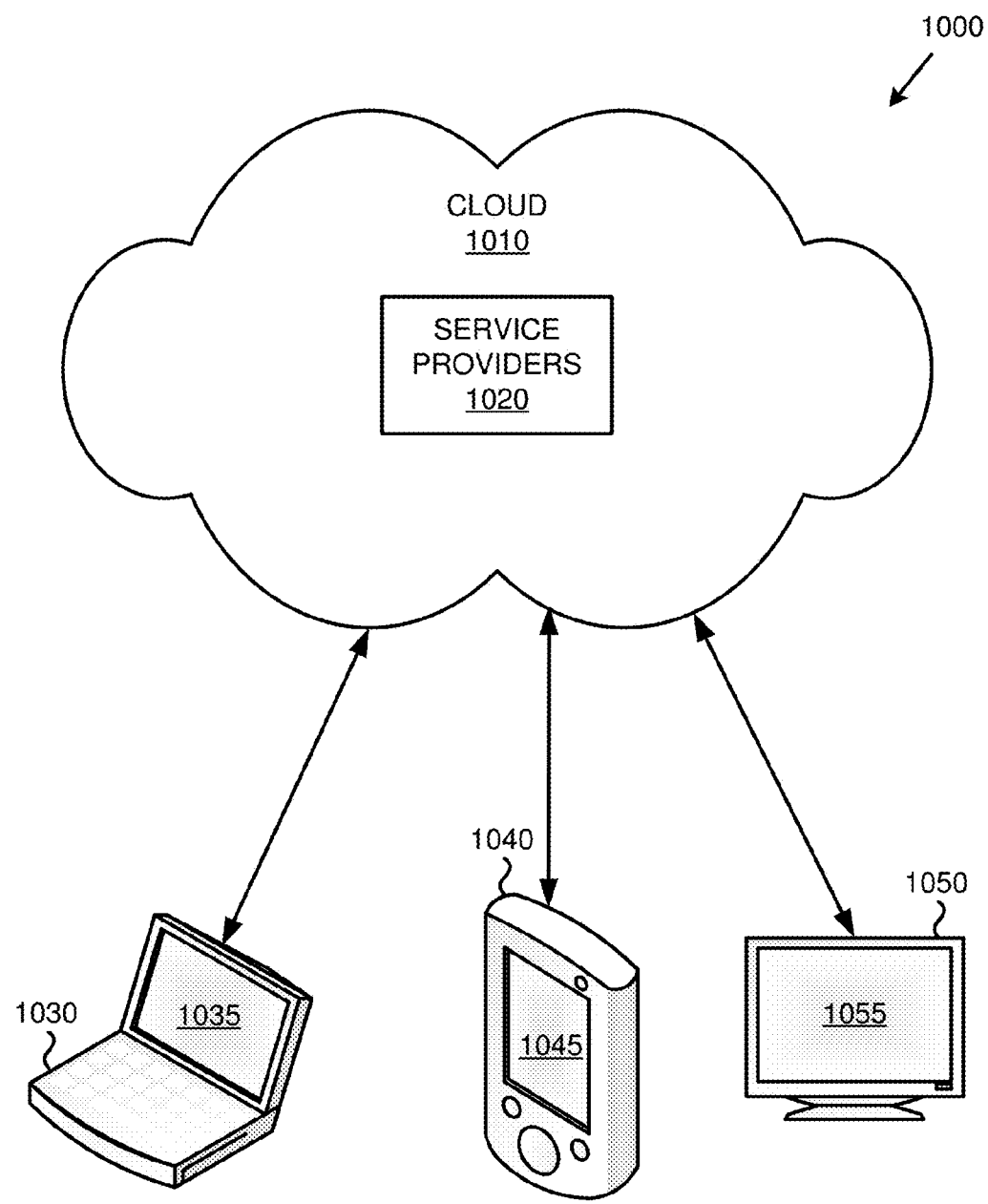
FIG. 10 is an example cloud-support environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections (e.g., 870, 960, 962, and 964).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processing unit;
   memory; and
   one or more microphones;
   the computing device configured with a voice-controlled digital personal assistant to perform operations for discovering capabilities of third-party voice-enabled resources, the operations comprising:
   receiving, via the one or more microphones, a digital voice input generated by a user;
   performing natural language processing using the digital voice input to determine a user voice request, wherein the user voice request is a request for available third-party voice-enabled resources installed on the computing device that are capable of performing a task;
   identifying one or more third-party voice-enabled resources that are capable of performing the task using voice input, wherein the one or more third-party voice-enabled resources are identified using a data structure that defines tasks supported by available third-party voice-enabled resources using voice input, wherein the data structure comprises:
   information identifying voice commands supported by the available third-party voice-enabled resources;
   information identifying voice command variations supported by the available third-party voice-enabled resources that define variations of user voice input that will perform the voice command, wherein at least one of the voice commands supports a plurality of different voice command variations; and
   information identifying voice command examples supported by the available third-party voice-enabled resources, wherein the one or more voice command examples are specific examples of user voice input that, if spoken by the user, will activate the voice command, wherein at least one of the voice commands has a plurality of different voice command examples that activate the voice command;
   providing a response to the user identifying the one or more third-party voice-enabled resources that are capable of performing the task;
   receiving a user-initiated command, wherein the user-initiated command identifies a specific third-party voice-enabled application from the one or more third-party voice-enabled resources, wherein the user-initiated command instructs the voice-controlled digital personal assistant to delete a voice command of the specific third-party voice-enabled application from the data structure, and to delete all of the voice command's corresponding voice command variations from the data structure that are associated with the voice command in the data structure, wherein the deleted voice command, and corresponding voice command variations, cannot be performed by user voice input; and
   performing the user-initiated command to delete the voice command of the specific third-party voice-enabled application from the data structure, and to delete all of the voice command's corresponding voice command variations from the data structure that are associated with the voice command in the data structure.

2. The computing device of claim 1 wherein the identifying the one or more third-party voice-enabled resources that are capable of performing the task comprises:
   evaluating third-party voice-enabled applications installed on the computing device.

3. The computing device of claim 1 wherein the identifying the one or more third-party voice-enabled resources that are capable of performing the task comprises:
   evaluating third-party voice-enabled resources available from a remote web service.

4. The computing device of claim 1 wherein providing the response to the user comprises, for each of the one or more third-party voice-enabled resources that are capable of performing the task:
　displaying an indication of at least one voice command variation supported by the third-party voice-enabled resource that will perform the task; and
　displaying an indication of at least one voice command example for performing the task.

5. The computing device of claim 1 the operations further comprising:
　receiving a user-initiated command, wherein the user-initiated command identifies a specific third-party voice-enabled resource from the one or more third-party voice-enabled resources and a request to practice tasks supported by the specific third-party voice-enabled resource.

6. The computing device of claim 1 the operations further comprising:
　receiving a user-initiated command, wherein the user-initiated command identifies a specific third-party voice-enabled resource from the one or more third-party voice-enabled resources and a request to practice a specific voice command variation for performing a specific task supported by the specific third-party voice-enabled resource.

7. The computing device of claim 1 wherein the task is a task for playing a movie, wherein the one or more third-party voice-enabled resources are capable of playing a movie on the computing device, and wherein the response to the user lists the one or more third-party voice-enabled resources that are capable of playing a movie.

8. A method, implemented by a computing device comprising a microphone, for discovering capabilities of third-party voice-enabled resources, the method comprising:
　receiving, by a voice-controlled digital personal assistant, a digital voice input generated by a user, wherein the digital voice input is received via the microphone
　performing natural language processing using the digital voice input to determine a user voice request, wherein the user voice request is a request for available tasks capable of being performed by a specific third-party voice-enabled resource;
　identifying, by the voice-controlled digital personal assistant, the available tasks capable of being performed by the specific third-party voice-enabled resource, wherein the available tasks are identified using a data structure that defines the available tasks supported by the specific third-party voice-enabled resource using voice input, wherein the specific third-party voice-enabled resource is a specific third-party voice-enabled application, and wherein the data structure comprises:
　　information identifying each of the available tasks supported by the specific third-party voice-enabled application;
　　information identifying voice command variations supported by the specific third-party voice-enabled application that define variations of user voice input that will perform the task, wherein at least one of the tasks supports a plurality of different voice command variations; and
　　information identifying voice command examples supported by the specific third-party voice-enabled application, wherein the voice command examples are specific examples of user voice input that, if spoken by the user, will activate the task, wherein at least one of the tasks has a plurality of different voice command examples that activate the task;
　providing, by the voice-controlled digital personal assistant, a response to the user identifying each of the available tasks capable of being performed by the specific third-party voice-enabled resource;
　receiving a user-initiated command, wherein the user-initiated command identifies the specific third-party voice-enabled application, wherein the user-initiated command instructs the voice-controlled digital personal assistant to delete a voice command of the specific third-party voice-enabled application from the data structure, and to delete all of the voice command's corresponding voice command variations from the data structure that are associated with the voice command in the data structure, wherein the deleted voice command, and corresponding voice command variations, cannot be performed by user voice input; and
　performing the user-initiated command to delete the voice command of the specific third-party voice-enabled application from the data structure, and to delete all of the voice command's corresponding voice command variations from the data structure that are associated with the voice command in the data structure.

9. The method of claim 8 wherein the specific third-party voice-enabled resource is a remote web resource, the method further comprising:
　retrieving the data structure from a remote web site.

10. The method of claim 8 wherein providing the response to the user comprises, for each of one or more tasks of the available tasks capable of being performed by the specific third-party voice-enabled resource:
　displaying, by the voice-controlled digital personal assistant, an indication of at least one voice command variation supported by the specific third-party voice-enabled resource that will perform the task; and
　displaying, by the voice-controlled digital personal assistant, an indication of at least one voice command example for performing the task.

11. A computer-readable storage medium storing computer-executable instructions for causing a computing device to perform operations for discovering capabilities of third-party voice-enabled resources, the operations comprising:
　receiving, by a voice-controlled digital personal assistant, a user request to practice voice commands provided by a third-party voice-enabled resource;
　receiving, by the voice-controlled digital personal assistant, a digital voice input generated by the user, wherein the digital voice input is received via a microphone of the computing device;
　performing natural language processing using the digital voice input to determine a user voice request;
　determining, by the voice-controlled digital personal assistant, whether the user voice request matches a voice command variation associated with a task of the third-party voice-enabled resource, wherein the third-party voice-enabled resource is a specific third-party voice-enabled application, wherein a data structure defines available tasks supported by the voice-controlled digital personal assistant using voice input, the data structure comprising:
　　information identifying each of the available tasks supported by the voice-controlled digital personal assistant;
　　information identifying voice command variations supported by the voice-controlled digital personal assistant that define variations of user voice input that will perform the task, wherein at least one of the tasks supports a plurality of different voice command variations; and information identifying voice command examples supported by the voice-controlled digital personal assistant, wherein the voice command examples are specific examples of user voice input that, if spoken by the user, will activate the task, wherein at least one of the tasks has a plurality of different voice command examples that activate the task;

providing, by the voice-controlled digital personal assistant, a response to the user indicating whether the user voice request matches a voice command variation associated with the task;

receiving a user-initiated command, wherein the user-initiated command identifies the specific third-party voice-enabled application, wherein the user-initiated command instructs the voice-controlled digital personal assistant to delete a voice command of the specific third-party voice-enabled application from the data structure, and to delete all of the voice command's corresponding voice command variations from the data structure that are associated with the voice command in the data structure, wherein the deleted voice command, and corresponding voice command variations, cannot be performed by user voice input; and performing the user-initiated command to delete the voice command of the specific third-party voice-enabled application from the data structure, and to delete all of the voice command's corresponding voice command variations from the data structure that are associated with the voice command in the data structure.

12. The computer-readable storage medium of claim 11 the operations further comprising:

presenting, by the voice-controlled digital personal assistant, a list of available tasks supported by the third-party voice-enabled resource, wherein the task is one of the list of available tasks.

13. The computer-readable storage medium of claim 11 wherein the user voice request matches a voice command variation associated with the task, and wherein the response provided to the user indicates that the user has successfully spoken the user voice request that would perform the task.

14. The computer-readable storage medium of claim 11 wherein the user voice request matches a voice command variation associated with the task, and wherein providing the response to the user comprises:

providing, by the voice-controlled digital personal assistant, a voice response comprising an emulated response of the third-party voice-enabled resource to the user voice request, wherein the emulated response is obtained from the data structure maintained by the voice-controlled digital personal assistant that defines supported tasks and their associated emulated voice responses, and wherein the voice-controlled digital personal assistant provides the emulated response without involvement of the third-party voice-enabled resource.

15. The computer-readable storage medium of claim 11 wherein the user voice request does not match a voice command variation associated with the task, and wherein providing the response to the user comprises:

providing, by the voice-controlled digital personal assistant, a response comprising one or more voice command examples for performing the task, wherein the one or more voice command examples are obtained from the data structure maintained by the voice-controlled digital personal assistant that defines supported tasks and their associated voice command examples.

* * * * *